US012583158B2

(12) United States Patent
Choi

(10) Patent No.: US 12,583,158 B2
(45) Date of Patent: Mar. 24, 2026

(54) ROTATION DEVICE FOR INJECTION MOLDING MACHINE

(71) Applicant: LS MTRON LTD., Anyang-si (KR)

(72) Inventor: Yun Jin Choi, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 319 days.

(21) Appl. No.: 18/377,869

(22) Filed: Oct. 9, 2023

(65) Prior Publication Data

US 2024/0123664 A1 Apr. 18, 2024

(30) Foreign Application Priority Data

Oct. 18, 2022 (KR) ........................ 10-2022-0134376
Aug. 23, 2023 (KR) ........................ 10-2023-0110289

(51) Int. Cl.
*B29C 45/73* (2006.01)
*B29C 45/04* (2006.01)
(52) U.S. Cl.
CPC ...... *B29C 45/7312* (2013.01); *B29C 45/0441* (2013.01)
(58) Field of Classification Search
CPC ........................ B29C 45/7312; B29C 45/0441
See application file for complete search history.

(56) References Cited

FOREIGN PATENT DOCUMENTS

| JP | 2013049142 A | * | 3/2013 |
| JP | 2014188942 A | * | 10/2014 |
| KR | 20200136577 A | | 12/2020 |

* cited by examiner

*Primary Examiner* — Virak Nguon
(74) *Attorney, Agent, or Firm* — K&L Gates LLP

(57) ABSTRACT

Disclosed herein is a rotation device for an injection molding machine. The rotation device includes: a fixed plate coupled to a movable plate, and provided with a first through hole which is formed in the center thereof; a rotating plate rotatably coupled to the fixed plate, provided with a second through hole corresponding to the first through hole, and formed such that a movable mold is coupled thereto; movement pipes installed on the fixed plate and the rotating plate, disposed to pass through the first through hole and the second through hole, and configured to provide movement paths for temperature control fluid between the fixed plate and the rotating plate; and fixed blocks configured to fix the movement pipes; and wherein the movement pipes are connected to the distribution pipes of a distributor which distributes temperature control fluid at the edge of the fixed plate.

11 Claims, 22 Drawing Sheets

LEFT ◀——▶ RIGHT

FORWARD ←——→ REARWARD

LEFT ◄──► RIGHT

LEFT ◄─────► RIGHT

ROTATION DEVICE FOR INJECTION MOLDING MACHINE

CROSS-REFERENCE TO RELATED APPLICATION

This application claims the benefits of Korean Patent Application No. 10-2022-0134376 filed on Oct. 18, 2022 and Korean Patent Application No. 10-2023-0110289 filed on Aug. 23, 2023, which are hereby incorporated by reference herein in their entirety.

FIELD

The present disclosure relates to an injection molding machine, and more particularly, to multiple injection.

BACKGROUND

An injection molding machine is equipment for obtaining an injection-molded product having a desired shape by injecting molten resin into a cavity having the shape of the product.

An injection molding machine has a molding part and an injection part.

The molding part is provided with a fixed plate and a movable plate that form a pair.

A fixed mold in which a first molding area forming a portion of a cavity is formed is coupled to the fixed plate.

A movable mold in which a second molding area forming another portion of the cavity is formed is coupled to the movable plate.

The movable plate can be moved in the direction toward or away from the fixed plate. Accordingly, the movable mold can also be moved in the direction toward or away from the fixed mold.

When the movable mold comes into contact with the fixed mold in response to the movement of the movable plate, the first molding area and the second molding area form a cavity, resulting in a mold-closed state. The injection part injects molten resin into the cavity in a mold-closed state. Then, the resin injected into the cavity solidifies and is formed into an injection-molded product.

Conversely, when the movable mold is separated from the fixed mold, the cavity is opened, resulting in a mold-opening state in which the injection-molded product molded in the cavity can be taken out from the cavity.

Furthermore, the injection molding machine is equipped with a fluid supply system that supplies temperature control fluid to the mold and then recovers it in order to control (cool or heat) the temperature of the mold.

The fluid supply system includes movement pipes to form movement paths for temperature control fluid.

Among such injection molding machines, there is an injection molding machine for multiple injection.

Multiple injection is a technology that can fabricate one injection-molded product by using multiple resins having different colors or materials.

In multiple injection, multiple injections are performed while forming cavities having different empty areas. Accordingly, it is necessary to rotate the mold to form cavities having different empty areas. For this purpose, an injection molding machine for multiple injection is equipped with a rotation device.

Generally, a rotating mold is a movable mold. The reason for this is that a fixed mold needs to be fixed because it has to be engaged with an injection part. Accordingly, an implementation is made such that cavities having different empty areas are formed by the rotation of the movable mold.

Accordingly, it is preferable that the rotation device is coupled to a movable plate. Furthermore, the movable mold is coupled to the rotation device. In other words, the movable mold is coupled to the movable plate via the rotation device.

When the rotation device operates, the movable mold is rotated by a set angle. It is obvious that the empty area of a cavity in a mold-closed state varies depending on the set angle.

Types of multiple injection include double injection. The present disclosure relates particularly to double injection.

An injection molding machine for double injection fabricates an injection-molded product by selectively rotating a movable mold forward and reversely by 180 degrees.

Even in an injection molding machine for double injection, the temperature of a mold needs to be controlled. Accordingly, such an injection molding machine for double injection needs to be equipped with the fluid supply system described above. Naturally, some of the movement pipes of the fluid supply system need to be installed to control the temperature of a movable mold.

However, some movement pipes are subject to torsional stress during the forward and reverse rotation of the movable mold. Furthermore, the accumulation of torsional stress shortens the lifespan of movement pipes. Accordingly, conventionally, the movement pipes are connected to the movable mold via a structure that passes the movement pipes through a movable plate and a rotation device. This connection structure can minimize the torsional stress of the movement pipes.

However, as the movement pipes pass through the movable plate and the rotation device and are then installed, the following problems occur:

First, the connection between the movement pipes and a distributor is cumbersome. Accordingly, a lot of work is required and the work is difficult, so that the manufacturing efficiency is not desirable. In this case, the distributor is intended to distribute temperature control fluid to the movement pipes or recover it from the individual movement pipes.

Second, in the process of replacing or removing the rotation device, the work of separating and mounting the movement pipes is difficult.

Third, the movement pipes need to be installed such that they are subject to torsional stress uniformly. However, when the movable mold is replaced, the movement pipes become tangled with each other and confused in the identification of their appropriate connection positions. For example, when eight movement pipes are connected to the movable mold, the movement pipes become entangled with each other during the process of dismantling the movable mold. Because of this, confusion arises between the appropriate connection positions of the movement pipes. Furthermore, when the movement pipes are connected, one or more of the movement pipes may be twisted during a work process regardless of the intention of a worker. In this case, the torsional stresses of the movement pipes may vary. In other words, the torsional stresses of the movement pipes may become uneven during the process of replacing the movable mold. Then, one or more of the movement pipes that are subject to excessive torsional stresses may be easily damaged.

3
Related Art Literature

Patent Document: Korean Patent Application Publication No. 10-2020-0136577

SUMMARY

The present disclosure has been conceived based on the following needs:

First, it is necessary to install movement pipes independently from a movable plate.

Second, it is necessary to modularize a rotation device, in which movement pipes are installed, into a single part.

Third, it is necessary to align the positions of movement pipes.

According to an aspect of the present disclosure, there is provided a rotation device for an injection molding machine, the rotation device including: a fixed plate coupled to a movable plate, and provided with a first through hole which is formed in the center thereof, a rotating plate rotatably coupled to the fixed plate, provided with a second through hole corresponding to the first through hole, and formed such that a movable mold is coupled thereto; movement pipes installed on the fixed plate and the rotating plate, disposed to pass through the first through hole and the second through hole, and configured to provide movement paths for temperature control fluid between the fixed plate and the rotating plate; and fixed blocks configured to fix the movement pipes; and wherein the movement pipes are connected to the distribution pipes of a distributor which distributes temperature control fluid at the edge of the fixed plate.

The fixed blocks may include: first blocks configured to fasten one ends of the movement pipes to the fixed plate, and coupled to the fixed plate; and second blocks configured to fasten the other ends of the movement pipes to the rotating plate, and coupled to the rotating plate; and the first blocks may be disposed alongside each other on one side of the fixed plate forming a portion of the edge of the fixed plate.

The first blocks may function as connection ports which connect movement paths for temperature control fluid between the distribution pipes and the movement pipes; and the second blocks may function as connection ports which connect movement paths for temperature control fluid between the movement pipes and transfer pipes, which are transfer paths for temperature control fluid between the movement pipes and the movable mold.

The rotation device may further include switching ports configured to change the moving direction of temperature control fluid, and at least one of the movement pipes may be installed such that the temperature control fluid passes through the switching port.

The switching ports may be coupled to the fixed plate.

First insertion grooves into which the movement pipes are inserted may be formed in the fixed plate on the surface of the fixed plate opposite to the surface of the fixed plate facing the rotating plate; and second insertion grooves into which the movement pipes are inserted may be formed in the rotating plate on the surface of the rotating plate opposite to the surface of the rotating plate facing the fixed plate.

The rotation device may further include prevention strips configured to prevent the movement pipes, inserted into the first insertion grooves or the second insertion grooves, from being separated.

When viewed in a direction from the fixed plate toward the rotating plate, the first insertion grooves and the second insertion grooves may be formed to have an angular difference of 45 degrees therebetween in an area adjacent to the first through hole and the second through hole, so that the first insertion grooves and the second insertion grooves coincide with each other when the rotating plate is rotated by 45 degrees from an initial 0-degree state.

The movement pipes may be inserted into the first insertion grooves, twisted by 135 degrees in the reverse rotation direction of the rotating plate while passing through the first through hole and the second through hole, and inserted into the second insertion grooves.

When viewed from the fixed plate toward the rotating plate, the first insertion grooves and the second insertion grooves may coincide with each other in an area adjacent to the first through hole and the second through hole; and the movement pipes may be inserted into the first insertion grooves, twisted by 90 degrees in a reverse rotation direction of the rotating plate while passing through the first through hole and the second through hole, and inserted into the second insertion grooves.

The fixed plate may be detachably coupled to the movable plate; and the movement pipes may be installed to be connected to the distribution pipes in the state in which the distribution pipes are disposed in an outer area outside the edge of the movable plate.

BRIEF DESCRIPTION OF THE DRAWINGS

The above and other objects, features, and advantages of the present disclosure will be more clearly understood from the following detailed description taken in conjunction with the accompanying drawings, in which.

DETAILED DESCRIPTION

Embodiments of the present disclosure will be described below with reference to the accompanying drawings. For brevity of description, descriptions of well-known configurations will be omitted or abridged as much as possible.
<Brief Description of Injection Molding Machine>

Figure 1:
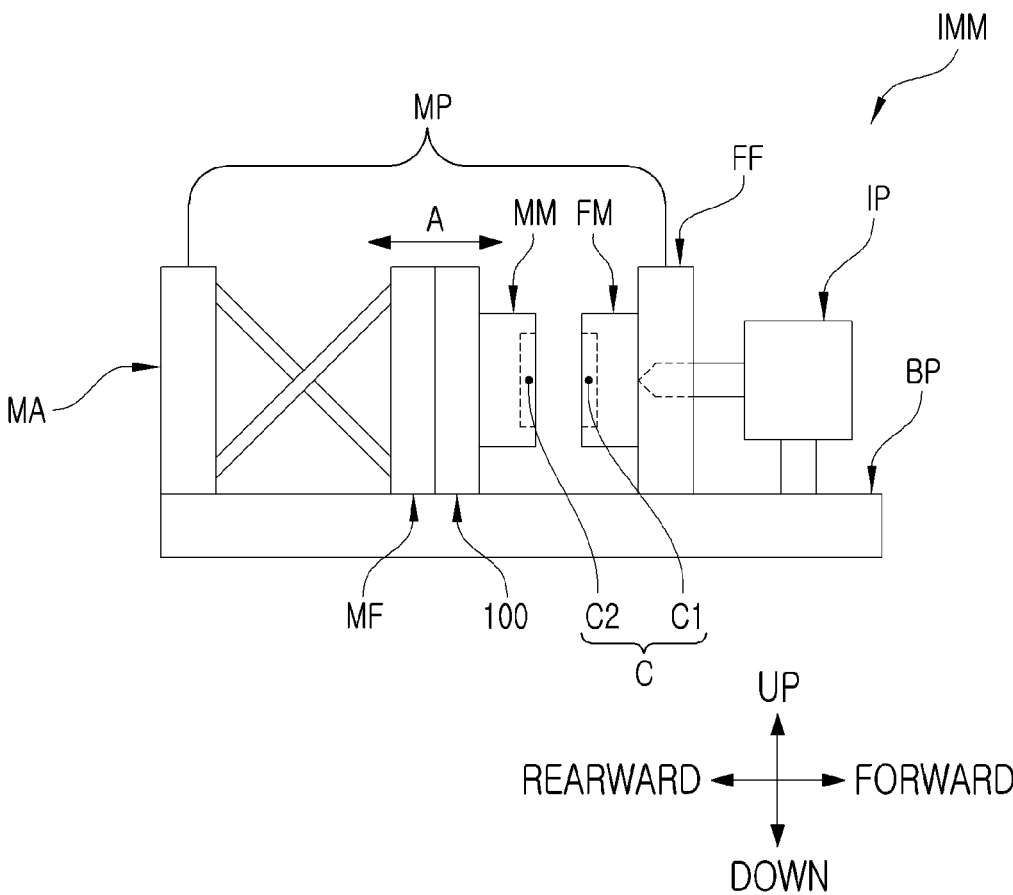
FIG. 1 is a schematic diagram of an injection molding machine to which a rotation device for an injection molding machine according to an embodiment of the present disclosure can be applied.

FIG. 1 is a schematic diagram of an injection molding machine IMM to which a rotation device 100 for an injection molding machine (hereinafter abbreviated as the "rotation device") according to an embodiment of the present disclosure is applied.

The injection molding machine IMM may be divided into a molding part MP and an injection part IP.

Figure 2:
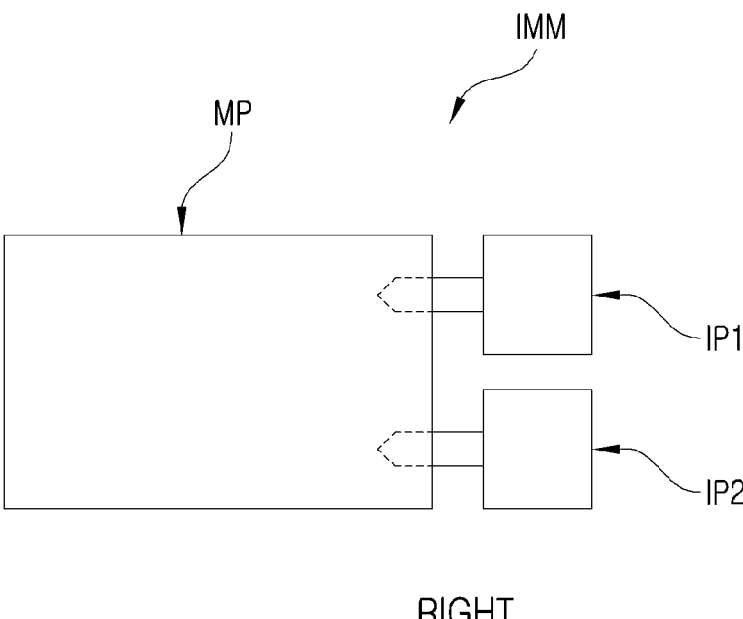
FIG. 2 is a reference diagram required for a supplementary description of the injection molding machine of FIG. 1.

For reference, in an injection molding machine IMM for double injection, two injection parts IP1 and IP2 may be coupled to one molding part MP, as shown in FIG. 2. Furthermore, the two injection parts IP1 and IP2 inject multiple types of resin having different materials or colors. Accordingly, one injection-molded product may be fabricated by different types of resin sequentially injected from the respective injection parts IP1 and IP2.

The molding part MP forms a cavity C having the shape of an injection-molded product, and selectively allows the injection-molded product to be molded and opens the cavity C so that a formed injection-molded product can be taken out from the cavity C.

The molding part MP includes a fixed plate FF, a fixed mold FM, a movable plate MF, a rotation device 100, a movable mold MM, and a movement device MA.

The fixed plate FF is disposed to face the injection part IP, and is fixedly installed on a base frame BP.

The fixed mold FM is fixedly coupled to the fixed plate FF to face the movable plate MF. A first molding area C1 forming a portion of the cavity C is formed in the fixed mold FM.

For double injection, two fixed molds FM may be coupled to the one fixed plate FF. It is obvious that two different first molding areas C1 may be formed in the respective fixed molds FM. However, depending on implementation, two first molding areas C1 may be formed in a single fixed mold FM.

The movable plate MF is provided to be movable in the direction (see arrow A) toward or away from the fixed plate FF.

The rotation device 100 is coupled to the movable plate MF, and is moved together with the movable plate MF.

The rotation device 100 is intended to rotate the movable mold MM.

According to an example, the rotation device 100 selectively rotates the movable mold MM forward and rearward by a rotation angle of 180 degrees.

The movable mold MM is coupled to the rotation device 100. In other words, the movable mold MM is ultimately coupled to the movable plate MF with the rotation device

100 interposed therebetween. Accordingly, the movable mold MM may also be moved together with the movable plate MF.

A second molding area C2 forming another portion of the cavity C is formed in the movable mold MM. Likewise, two movable molds MM may be provided in a single movable plate MF. Alternatively, an implementation may be made such that two second molding areas C2 are formed in a single movable mold MM.

Accordingly, when the movable mold MM comes into contact with the fixed mold FM, two cavities C are formed. In addition, the two injection parts IP fill the respective corresponding cavities C.

The movement device MA moves the movable plate MF in the direction toward or away from the fixed plate FF.

When the movable plate MF approaches the fixed plate FF, the movable mold MM may be brought into contact with the fixed mold FM, resulting in a mold-closed state. Furthermore, when the movable plate MF moves away from the fixed plate FF, the movable mold MM may be spaced away from the fixed mold FM, resulting in a mold-opened state.

Figure 3:
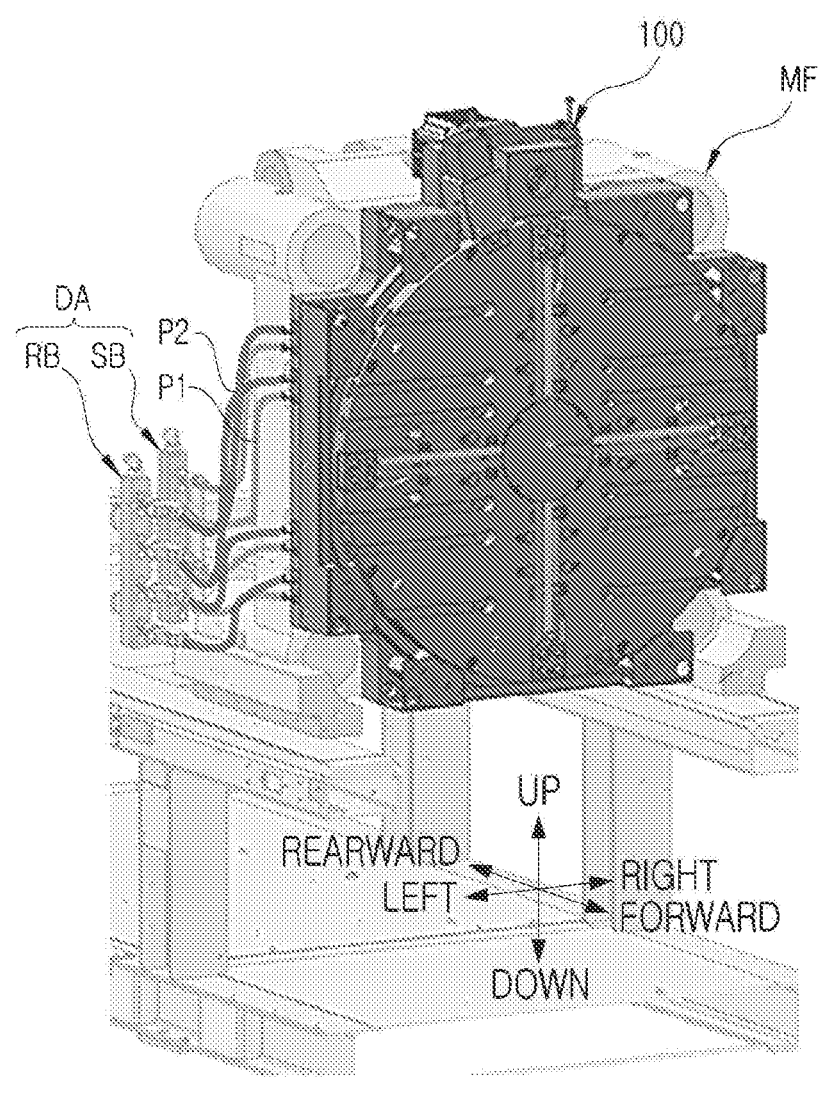
FIG. 3 shows a state in which a rotation device for an injection molding machine according to an embodiment of the present disclosure is coupled to a movable plate.

FIG. 3 shows a state in which the rotation device 100 according to an embodiment of the present disclosure is coupled to the movable plate MF.

The rotation device 100 is coupled to the movable plate MF, and a distributor DA is disposed on one side of the movable plate MF.

The distributor DA may be divided into a supply block SB and a recovery block RB.

The supply block SB is provided to supply temperature control fluid to the movable mold MM. The supply block SB has a supply distribution pipe P1 configured to supply temperature control fluid to the movable mold MM.

The recovery block RB is provided to recover the temperature control fluid from the movable mold MM. The recovery block RB has a recovery distribution pipe P2 configured to recover temperature control fluid from the movable mold MM.

For reference, in FIG. 3, the blue line is the supply distribution pipe P1, and the red line is the recovery distribution pipe P2.
<Detailed Description of Rotation Device>

Figure 4:
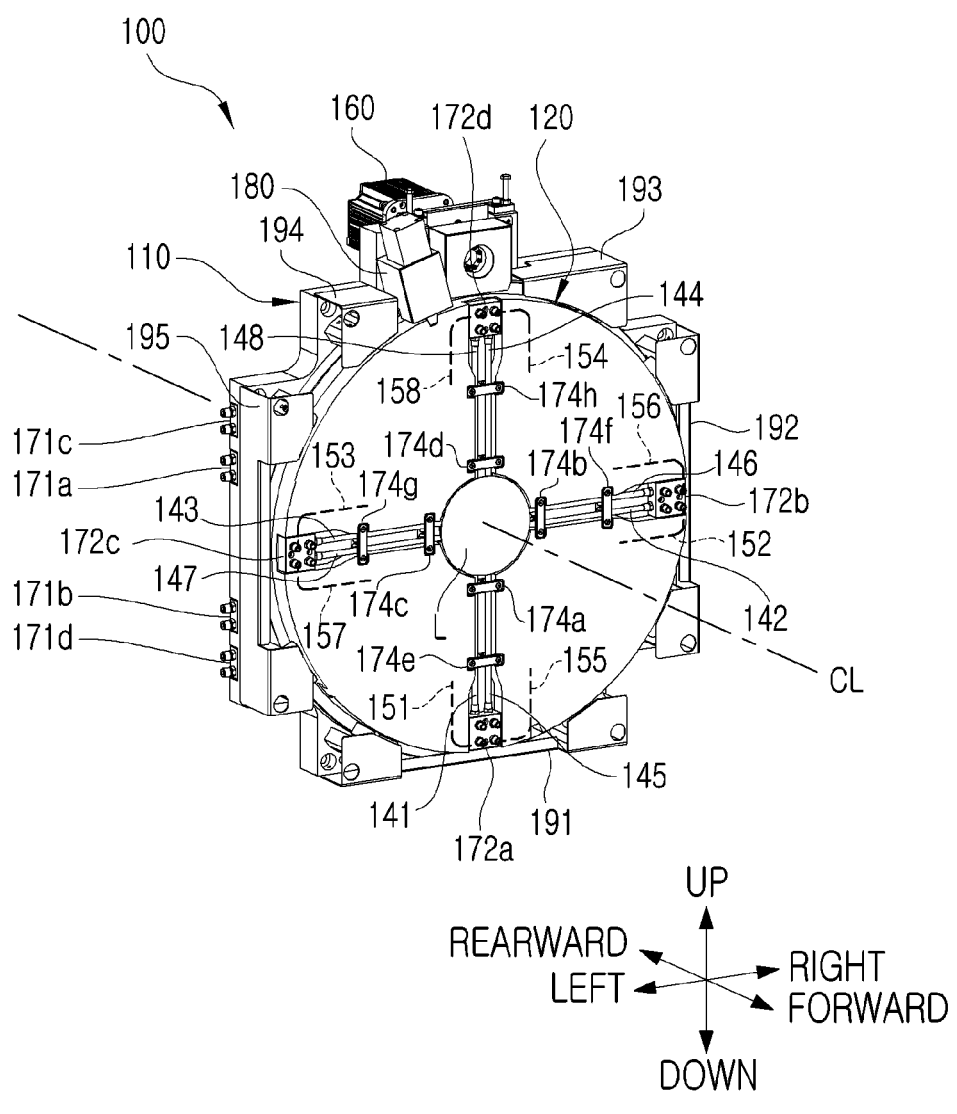
FIG. 4 is a perspective view of a rotation device for an injection molding machine according to an embodiment of the present disclosure.
Figure 5:
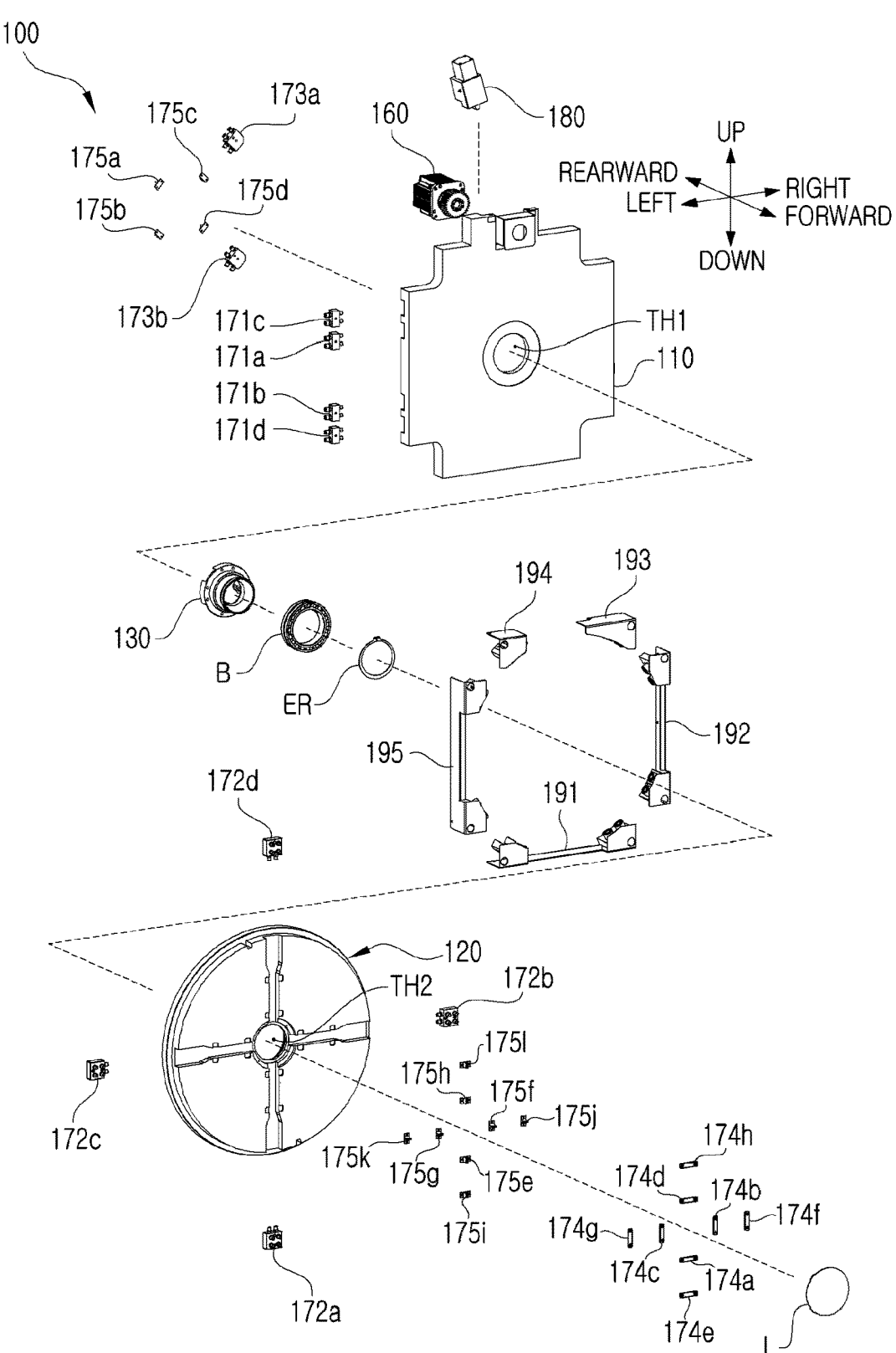
FIG. 5 is an exploded perspective view of the rotation device of FIG. 4.

FIG. 4 is a perspective view of the rotation device 100 according to an embodiment of the present disclosure, and FIG. 5 is an exploded perspective view of the rotation device 100 of FIG. 4 with movement pipes 141 to 148 and transfer pipes 151 to 158 removed therefrom.

The rotation device 100 of FIG. 4 includes a fixed plate 110, a rotating plate 120, a joint 130, the movable pipes 141 to 148, the transfer pipes 151 to 158, a rotator 160, fixed blocks 171*a* to 171*d* and 172*a* to 172*d*, switching ports 173*a* and 173*b*, prevention strips 174*a* to 174*h*, preventers 175*a* to 175*l*, a setter 180, and guiders 191 to 195.

Prior to the following description of the rotation device 100 according to the present embodiment, directions are defined. In the arrangement of the fixed plate 110 and the rotating plate 120, the direction toward the rotating plate 120 is defined as a forward direction and the direction toward the fixed plate 110 is defined as a rearward direction (see the directions indicated in FIGS. 4 and 5).

The fixed plate 110 is fixedly coupled to the movable plate MF.

Figure 6:
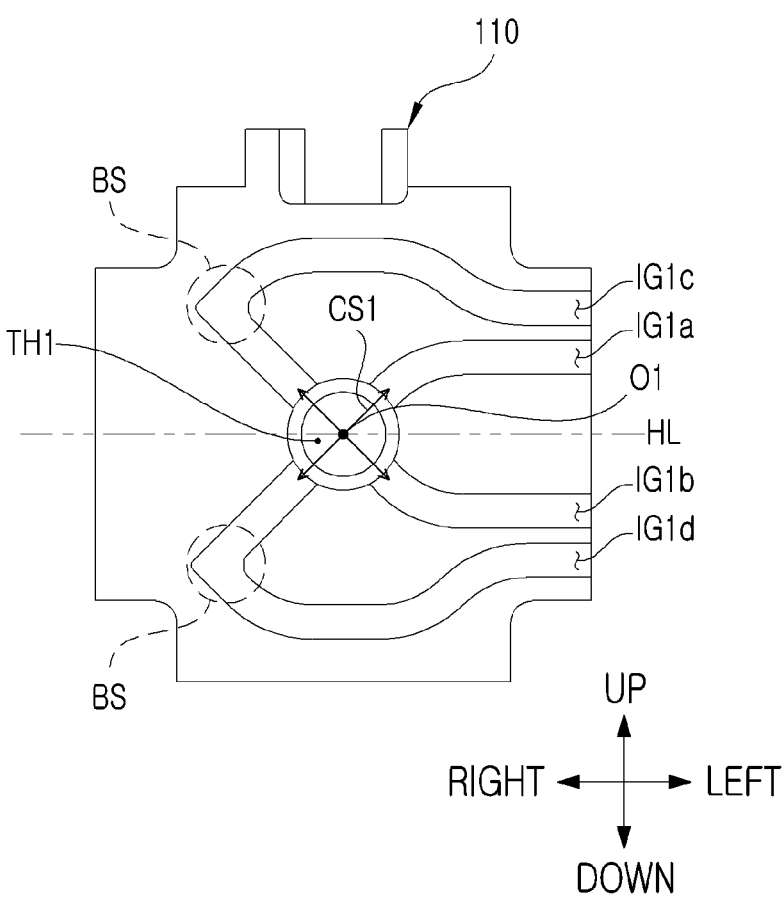
FIG. 6 is a rear view of a fixed plate applied to the rotation device of FIG. 4.

FIG. 6 is a rear view showing the fixed plate 110 when viewed from the rotating plate 120 toward the fixed plate 110, i.e., when viewed from the front to the rear.

A first through hole TH1 is formed in the center of the fixed plate 110. The center O1 of the first through hole TH1 is disposed on the rotation center line CL (see FIG. 4) of the rotating plate 120.

First insertion grooves IG1a to IG1d are formed on its rear surface of the fixed plate 110. In the present embodiment, a total of four first insertion grooves IG1a to IG1d are formed.

One ends of the first insertion grooves IG1a to IG1d are disposed alongside each other on the left side of the fixed plate 110 so that they are all open to the left. The other ends thereof are disposed toward the first through hole TH1 so that they are all open to the first through hole TH1. It is obvious that the first insertion grooves IG1a to IG1d are open rearward.

In addition, based on a horizontal line HL passing through the first through hole TH1 in the left-right directions, the two first insertion grooves IG1a and IG1c on the upper side are symmetrical to the two first insertion grooves IG1b and IG1d on the lower side.

According to the present embodiment, the first insertion grooves IG1a to IG1d are formed to meet the first through hole TH1 approximately perpendicularly in an area adjacent to the first through hole TH1. In particular, the first insertion grooves IG1a to IG1d are formed in a first cross shape CS1 having an angle of 90 degrees between adjacent first insertion grooves IG1a to IG1d in the area toward the first through hole TH1. For this purpose, the two first insertion grooves IG1a and IG1b have a first length, and the remaining two first insertion grooves IG1c and IG1d have a second length. In this case, the second length is longer than the first length. Furthermore, the long first insertion grooves IG1c and IG1d each have an area BS bent at a right angle to bend the moving direction of temperature control fluid.

The movable mold MM is coupled to the rotating plate 120.

The rotating plate 120 is rotatably coupled to the fixed plate 110. Accordingly, when the rotating plate 120 rotates, the movable mold MM is also rotated.

According to an example, the rotating plate 120 selectively rotates forward and rearward by an angle of 180 degrees. Accordingly, the movable mold MM is selectively rotated forward and rearward by 180 degrees.

Figure 7:
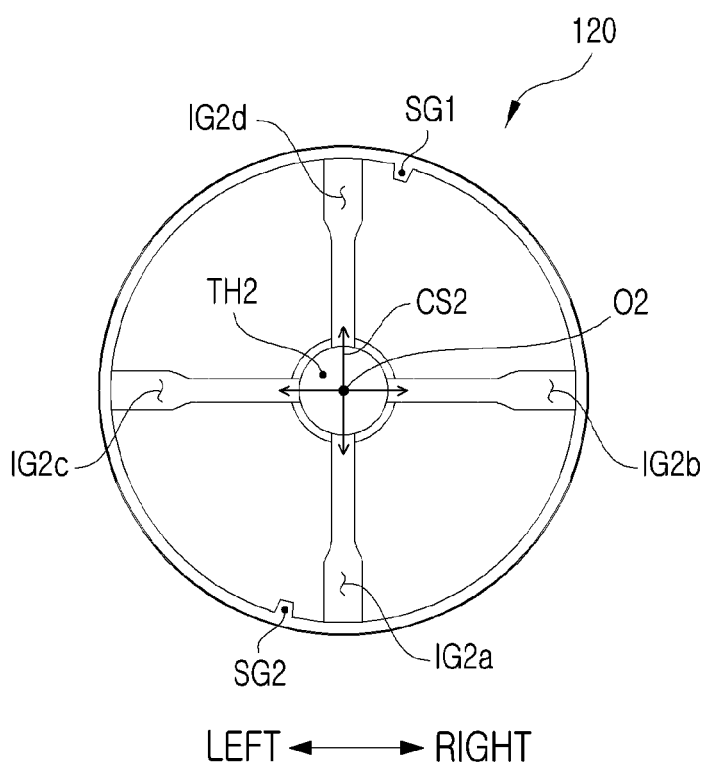
FIG. 7 is a front view of a rotating plate applied to the rotation device of FIG. 4.

FIG. 7 is a front view of the rotating plate 120 when viewed from the movable mold MM toward the rotating plate 120.

A second through hole TH2 corresponding to the first through hole TH1 is formed in the rotating plate 120.

The center O2 of the second through hole TH2 is disposed on the rotation center line CL. Furthermore, the rotating plate 120 and the movable mold MM rotate around the rotation center line CL.

For reference, in the front view, the second through hole TH2 may be covered by a lid L coupled to the rotating plate 120.

Second insertion grooves IG2a to IG2d are formed in the front of the rotating plate 120. In the present embodiment, a total of four second insertion grooves IG2a to IG2d are formed to correspond to the number of first insertion grooves IG1a to IG1d.

The second insertion grooves IG2a to IG2d are formed in a second cross shape CS2 with the second through hole TH2 disposed at the center. Accordingly, the second insertion grooves IG2a to IG2d are connected perpendicular to the second through hole TH2.

Additionally, the lengths of the second insertion grooves IG2a to IG2d are all the same.

It is obvious that one ends of the second insertion grooves IG2a to IG2d are connected to the second through hole TH2 so that they are open to the second through hole TH2, and the other ends of the second insertion grooves IG2a to IG2d are opened to the upper, lower, left, and right sides of the rotating plate 120, respectively. Likewise, the second insertion grooves IG2a to IG2d are open forward.

Figure 8:
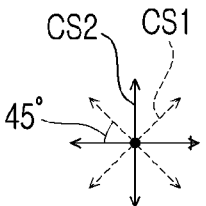
FIG. 8 is a reference diagram illustrating the arrangements of insertion grooves in the fixed plate of FIG. 6 and the rotating plate of FIG. 7.
Figure 8:
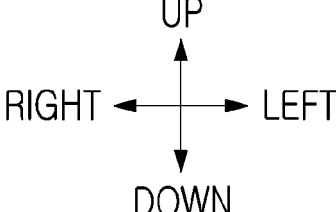

According to an example, as shown in the reference diagram of FIG. 8, when viewed from the fixed plate 110 toward the rotating plate 120, the first cross shape CS1 and the second cross shape CS2 have an angle of 45 degrees therebetween. In other words, when the rotating plate 120 is in an initial 0-degree state, the first cross shape CS1 and the second cross shape CS2 form an angle of 45 degrees therebetween. Then, when the rotating plate 120 has rotated by 45 degrees, the first cross shape CS1 and the second cross shape CS2 coincide with each other. More specifically, the first insertion grooves IG1a to IG1d and the second insertion grooves IG2a to IG2d form an initial angle of 45 degrees therebetween in an area adjacent to the first through hole TH1 and the second through hole TH2. When the rotating plate 120 has rotated by 45 degrees, the first insertion grooves IG1a to IG1d and the second insertion grooves IG2a to IG2d coincide with each other.

However, depending on implementation, it may be sufficient if the first cross shape CS1 and the second cross shape CS2 have an angle larger than 0 degrees and smaller than 45 degrees. This will be described later.

In addition, two setting depressions SG1 and SG2 are formed in the rotating plate 120 at positions symmetrical to each other with respect to the rotation center line CL. In other words, the two setting depressions SG1 and SG2 are disposed to face each other at an angle of 180 degrees. Furthermore, both the setting depressions SG1 and SG2 are open in the radial directions. The function of these setting depressions SG1 and SG2 will be described later.

A joint 130 is provided to rotatably couple the rotating plate 120 to the fixed plate 110.

The joint 130 is disposed in the first through hole TH1 and the second through hole TH2.

Figure 9:
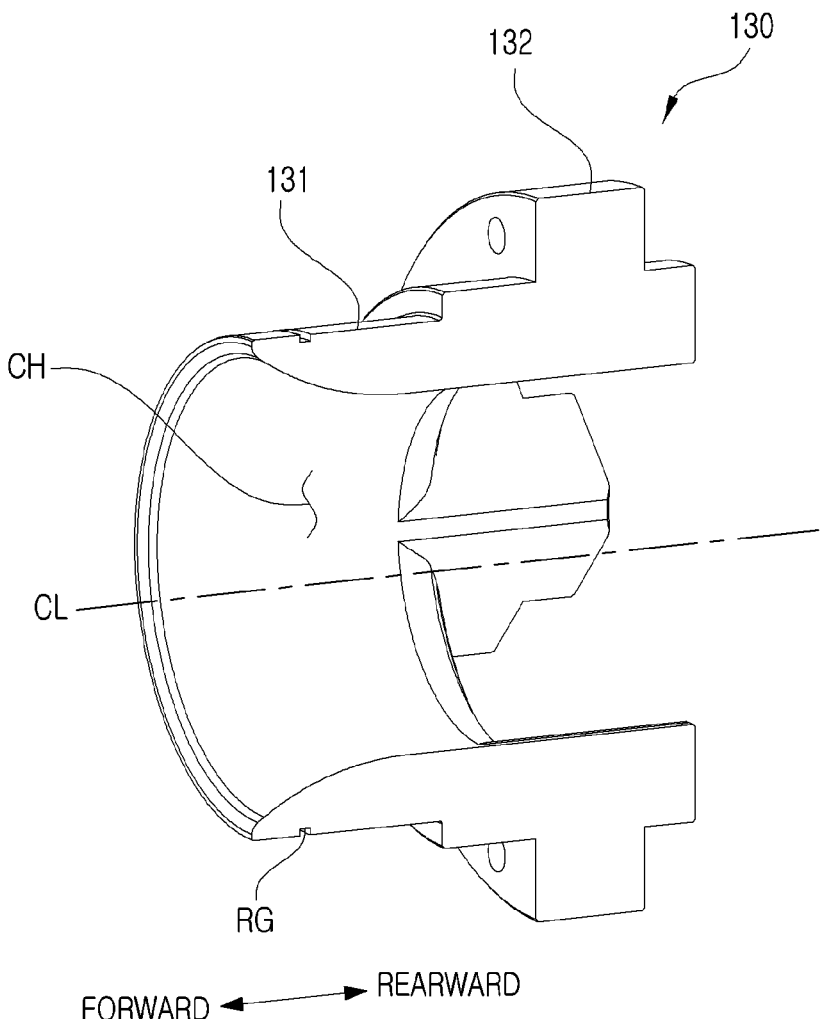
FIG. 9 is an excerpt view of a joint applied to the rotation device of FIG. 4.

As shown in the excerpt view of FIG. 9, the joint 130 has a cylindrical shape having a hollow CH, and the center of the hollow CH is disposed on the rotation center line CL when viewed from the front.

The joint 130 has a support portion 131 and a stop portion 132.

The support portion 131 supports the inner circumferential surface of the fixed plate 110 forming the first cylindrical hole TH1 of the fixed plate 110, and the inner circumferential surface of the rotating plate 120 forming the second cylindrical hole TH2 of the rotating plate 120.

Preferably, a bearing B may be interposed between the joint 130 and the rotating plate 120 to guide the rotating plate 120 through smooth rotation.

A ring groove RG is formed in the support portion 131 in the circumferential direction.

The ring groove RG is formed to allow an elastic ring ER to be inserted and installed in order to prevent the bearing B from being separated.

The stop portion 132 is caught on a catch protrusion on the fixed plate 110.

Depending on implementation, the joint 130 may be fabricated to be integrated with the fixed plate 110 or the rotating plate 120.

The movement pipes 141 to 148 provide movement paths of temperature control fluid between the fixed plate 110 and the rotating plate 120.

The movement pipes 141 to 148 are installed on the fixed plate 110 and the rotating plate 120. In particular, the intermediate cut portions of the movement pipes 141 to 148 are installed to pass through the first through hole TH1 and the second through hole TH2. More specifically, the movement pipes 141 to 148 are installed to pass through the fixed plate 110, the first through hole TH1 and the second through hole TH2, and then the rotating plate 120.

Figure 10:
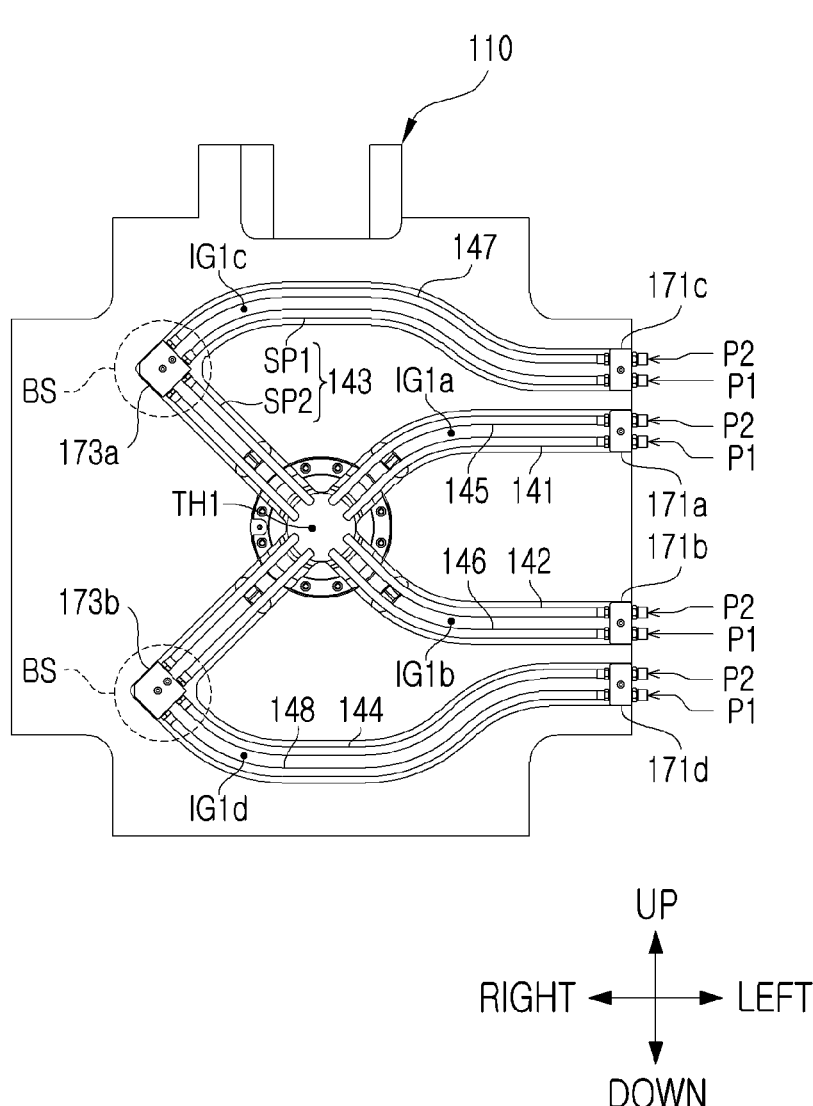
FIGS. 10 and 11 are reference diagrams illustrating the installation structure of movement pipes applied to the rotation device of FIG. 4.

As shown in the reference diagram of FIG. 10, the movement pipes 141 to 148 are installed to be inserted into the first insertion grooves IG1a to IG1d in the area where they pass through the fixed plate 110. Furthermore, as shown in the reference diagram of FIG. 11, the movement pipes 141 to 148 are installed to be inserted into the second insertion grooves IG2a to IG2d in the area where they pass through the rotating plate 120. In other words, when viewed in terms of supply paths of temperature control fluid, the movement pipes 141 to 148 are installed to sequentially pass through the first insertion grooves IG1a to IG1d, the first through hole TH1 and the second through hole TH2, and the second insertion grooves IG2a to IG2d.

One ends of the movement pipes 141 to 148 are connected to the distribution pipes P1 and P2, and the other ends of the movement pipes 141 to 148 are connected to the transfer pipes 151 to 158 to be described later.

In the present embodiment, a total of eight movement pipes 141 to 148 are provided. Among these, the movement pipes 141 and 144 are provided to supply temperature control fluid to the movable mold MM. Furthermore, the remaining movement pipes 145 to 148 are provided to recover the temperature control fluid from the movable mold MM. Accordingly, two movement pipes 141 to 148 paired with each other for supply and recovery are inserted into one of the first insertion grooves IG1a to IG1d or into one of the second insertion grooves IG2a to IG2d.

Figure 12:
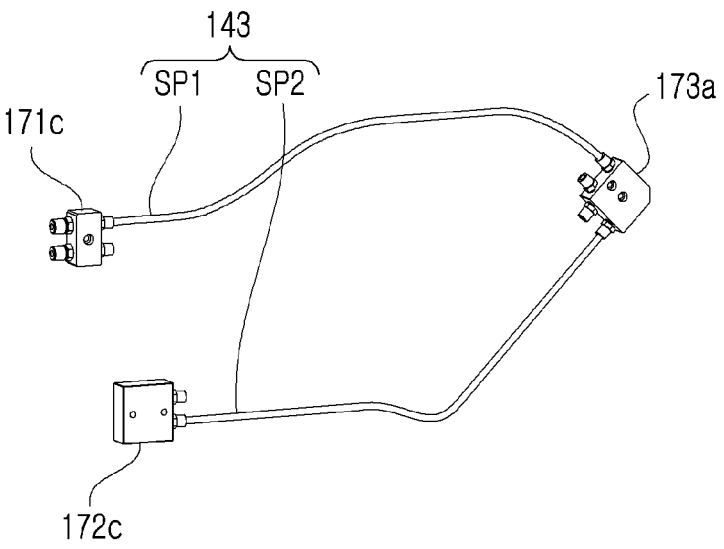
FIG. 12 is a reference diagram illustrating the structure of each of the movement pipes applied to the rotation device of FIG. 4.

In addition, the movement pipes 143, 144, 147, and 148 inserted into the relatively long first insertion grooves IG1c and IG1d are each separated. For example, as shown in the example of FIG. 12, the movement pipe 143 is separated into separation pipe 1 SP1 and separation pipe 2 SP2. Furthermore, separation pipe 1 SP1 and separation pipe 2 SP2 are connected via a switching port 173a. The remaining movement pipes of codes 144, 147, and 148 all have the same separation structure. This separation structure will be described in more detail later.

Figure 13:
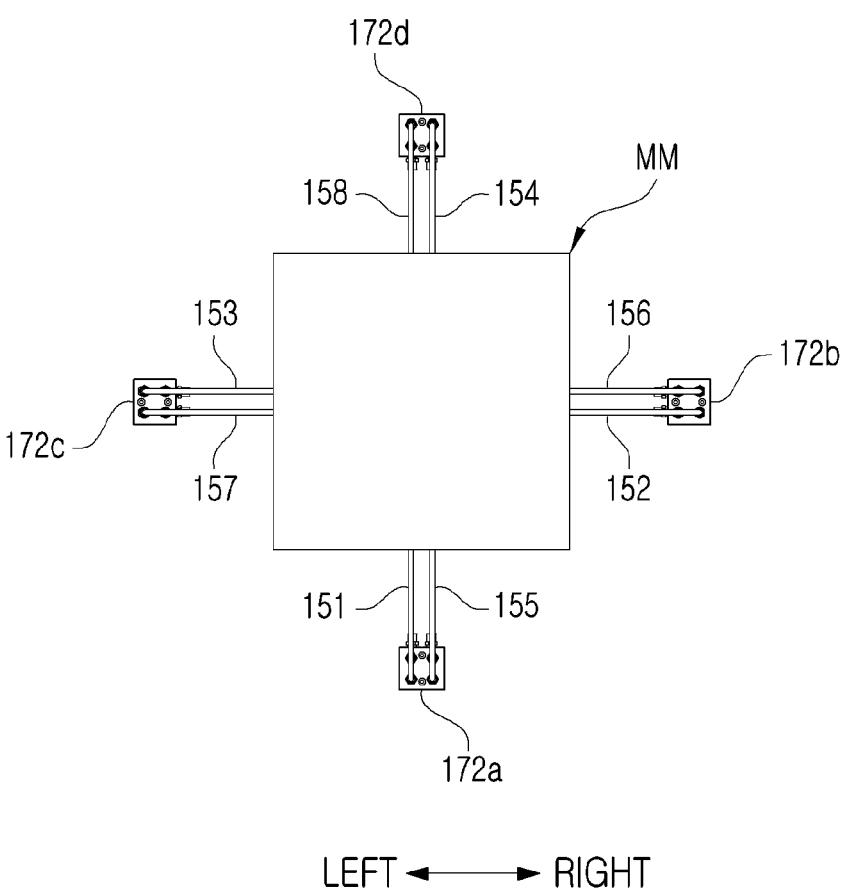
FIG. 13 is a reference diagram illustrating the installation structure of transfer pipes applied to the rotation device of FIG. 4.

The transfer pipes 151 to 158 provide transfer paths of temperature control fluid between the movement pipes 141 to 148 and the movable mold MM. Accordingly, as shown in the schematic diagram of FIG. 13, one ends of the transfer pipes 151 to 158 are connected to the movable pipes 141 to 148 via the fixed blocks 172a to 172d, and the other ends thereof are coupled to the movable mold MM.

For reference, in FIG. 4, the transfer pipes 151 to 158 are conceptually shown for the sake of convenience.

Depending on implementation, the transfer pipes 151 to 158 may be omitted from the rotation device 100. Nonetheless, when the rotation device 100 is installed in the injection molding machine IMM, the transfer pipes 151 to 158 need to be provided.

The rotator 160 provides rotational force intended to rotate the rotating plate 120.

The rotator 160 may be provided to be coupled to the fixed plate 110.

Figure 14:
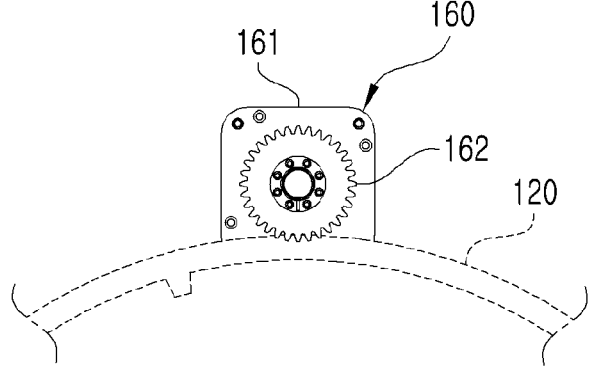
FIG. 14 is a reference diagram illustrating a rotator applied to the rotation device of FIG. 4.

According to an example described with reference to FIG. 14, the rotator 160 has a rotation motor 161 and a rotation gear 162.

The rotation motor 161 generates rotational force by using electromagnetic force.

The rotation gear 162 is rotated by the rotational force of the rotation motor 161. This rotation gear 162 is engaged with the rotating plate 120 at the edge of the rotating plate 120. Accordingly, when the rotation gear 162 rotates, the rotating plate 120 is rotated using the joint 130 as the rotation shaft thereof.

The fixed blocks 171a to 171d and 172a to 172d are provided to fix the movement pipes 141 to 148 and the transfer pipes 151 to 158.

Figure 15:
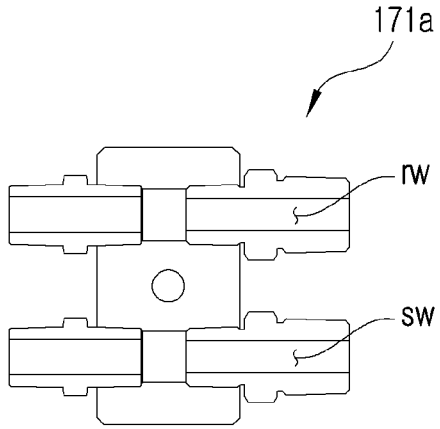
FIG. 15 is a reference diagram illustrating a fixed block applied to the rotation device of FIG. 4.

As in the example shown in FIG. 15, each of the fixed blocks 171a to 171d and 172a to 172d has a supply flow path sw and a recovery flow path rw. Accordingly, a pair of movement pipes 141 to 148 for supply and recovery may be fastened together to one of the fixed blocks 171a to 171d and 172a to 172d.

For reference, although the supply flow path sw and the recovery flow path rw are formed straight in the example of FIG. 15, they may each be formed bent at a right angle to change direction.

As shown in FIG. 10, among the fixed blocks 171a to 171d and 172a to 172d, the first blocks 171a to 171d are fixedly coupled to the fixed plate 110. Furthermore, one ends of the movement pipes 141 to 148 are coupled to the first blocks 171a to 171d. Accordingly, the movement pipes 141 to 148 are fixed to the fixed plate 110 via the first blocks 171a to 171d. In other words, the first blocks 171a to 171d have the function of fixing the movement pipes 141 to 148 to the fixed plate 110.

The distribution pipes P1 and P2 are also coupled to the first blocks 171a to 171d. Accordingly, the first blocks 171a to 171d function as connection ports that connect movement paths of temperature control fluid between the distribution pipes P1 and P2 and the movement pipes 141 to 148. In other words, the first blocks 171a to 171d have the function of connecting the distribution pipes P1 and P2 and the movement pipes 141 to 148 to each other, thereby transferring temperature control fluid between the distribution pipes P1 and P2 and the movement pipes 141 to 148.

For example, a structure for fixing one ends of the movement pipes 141 to 148 and a structure for connecting movement paths of temperature control fluid may be provided separately. In this case, a more complicated structure needs to be adopted and also the depth of the first insertion grooves IG1a to IG1d needs to be deeper, so that the manufacturing cost is increased. However, according to the present embodiment, the first blocks 171a to 171d may function as connection ports while fixing one ends of the movement pipes 141 to 148 to connect movement paths of temperature control fluid, so that a simple structure can be achieved and the depth of the first insertion grooves IG1a to IG1d can be minimized. Furthermore, the work of connecting the movement pipes 141 to 148 or the distribution pipes P1 and P2 may be easily performed.

The first blocks 171a to 171d are inserted into the first insertion grooves IG1a to IG1d. Accordingly, there are provided a number of first blocks 171a to 171d equal to the number of first insertion grooves IG1a to IG1d. In the present embodiment, four first blocks 171a to 171d are provided.

The first blocks 171a to 171d are coupled to the fixed plate 110 in such a manner as to be inserted into the first insertion grooves IG1a to IG1d at the edge of the fixed plate 110. Accordingly, the movement pipes 141 to 148 and the distribution pipes P1 and P2 are connected to each other via the first blocks 171a to 171d at the edge of the fixed plate 110.

More specifically, the first blocks 171a to 171d are disposed alongside each other on the left side of the edge of the fixed plate 110. Accordingly, as shown in FIG. 3, the distribution pipes P1 and P2 may be disposed in an outer area on the left side outside the edge of the movable plate MF. In other words, the distribution pipes P1 and P2 may be connected to the movable pipes 141 to 148 in the state of being disposed in the outer area outside the edge of the movable plate MF. In other words, the movable pipes 141 to 148 are installed such that the distribution pipes P1 and P2 can be disposed in an area outside the edge of the movable plate MF.

It is obvious that depending on implementation, it may be sufficient if the first blocks 171a to 171d are disposed alongside each other on any one side of the edge of the fixed plate 110.

Figure 11:
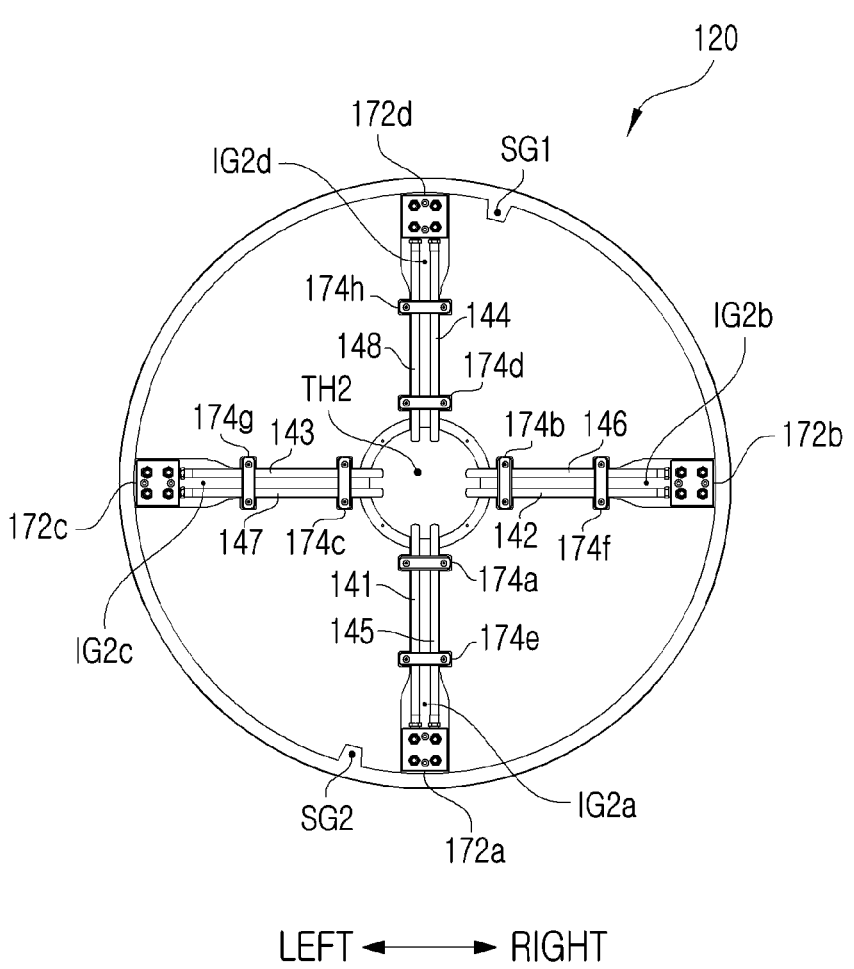

As shown in FIG. 11, among the fixed blocks 171a to 171d and 172a to 172d, the second blocks 172a to 172d are fixedly coupled to the rotating plate 120. Furthermore, the other ends of the movement pipes 141 to 148 are coupled to the second blocks 172a to 172d. Accordingly, the movement pipes 141 to 148 are fixed to the rotating plate 120 via the second blocks 172a to 172d. In other words, the second blocks 172a to 172d have the function of fixing the movement pipes 141 to 148 to the rotating plate 120.

As described above, the transfer pipes 151 to 158 are also coupled to the second blocks 172a to 172d. Accordingly, the second blocks 172a to 172d function as connection ports that connect movement paths of temperature control fluid between the movement pipes 141 to 148 and the transfer pipes 151 to 158. In other words, the second blocks 172a to 172d have the function of connecting the movement pipes 141 to 148 and the transfer pipes 151 to 158 to each other, thereby transferring temperature control fluid between the movement pipes 141 to 148 and the transfer pipes 151 to 158.

Likewise, the second blocks 172a to 172d fix one ends of the transfer pipes 151 to 158 while fixing the other ends of the movement pipes 141 to 148, so that a simple structure can be achieved and the depth of the second insertion grooves IG2a to IG2d can be minimized. It is obvious that the work of connecting the movement pipes 141 to 148 or the transfer pipes 151 to 158 can also be easily performed.

The second blocks 172a to 172d are inserted and installed into the second insertion grooves IG2a to IG2d. Accordingly, there are provided a number of second blocks 172a to 172d equal to the number of second insertion grooves IG2a to IG2d. In the present embodiment, four second blocks 172a to 172d are provided.

The second blocks 172a to 172d are coupled to the rotating plate 120 in the state of being inserted into the second insertion grooves IG2a to IG2d at the edge of the rotating plate 120. Accordingly, the movement pipes 141 to 148 and the transfer pipes 151 to 158 are connected to each other via the second blocks IG2a to IG2d at the edge of the rotating plate 120. In the present embodiment, the second blocks IG2a to IG2d are disposed on respective sides of the square edge of the rotating plate 120.

Referring again to FIG. 10, the switching ports 173a and 173b are intended to fix separation pipe 1 SP1 and separation pipe 2 SP2 while connecting separation pipe 1 SP1 and separation pipe 2 SP2.

The switching ports 173a and 173b are disposed in the areas BS where the first insertion groove IG1c or IG1d is bent at 90 degrees. Accordingly, the switching ports 173a and 173b may function as connection ports that change the moving direction of temperature control fluid, moving along separation pipe 1 SP1 or separation pipe 2 SP2 in the area BS where the first insertion groove IG1c or IG1d is bent at 90 degrees, by 90 degrees and connect moving paths of temperature control fluid. In other words, among the movement pipes 141 to 148, the four long movement pipes 143, 144, 147, and 148 are each separated into separation pipe 1 SP1 and separation pipe 2 SP2, and are installed such that temperature control fluid can pass through the changing ports 173a and 173b. It is obvious that the switching ports 173a and 173b are also coupled to the fixed plate 110 in such a manner as to be inserted into the first insertion grooves IG1c and IG1d. Accordingly, the switching ports 173a and 173b also function to fix separation pipe 1 SP1 and separation pipe 2 SP2 to the fixed plate 110.

For reference, the switching ports 173a and 173b may be omitted depending on the shape or fixing structure of the first insertion grooves IG1a to IG1d.

As shown in FIGS. 4 and 11, the prevention strips 174a to 174h prevent the movement pipes 141 to 148 inserted into the second insertion grooves IG2a to IG2d from being separated. In the present embodiment, prevention strips configured to prevent the movement pipes 141 to 148 inserted into the first insertion grooves IG1a to IG1d from being separated are omitted. It is obvious that depending on implementation, it may be sufficiently contemplated that prevention strips configured to prevent the movement pipes 141 to 148 inserted into the first insertion grooves IG1a to IG1d from being separated are provided.

The preventers 175a to 175l are provided to be inserted into the first insertion grooves IG1a to IG1d or the second insertion grooves IG2a to IG2d.

According to the present embodiment, one of the supply movement pipes 141 to 144 and one of the recovery movement pipes 145 to 148 are paired to each other and disposed in each of the first insertion grooves IG1a to IG1d or the second insertion grooves IG2a to IG2d. Accordingly, it is necessary to prevent the phenomenon in which both movement pipes 141 to 148 are twisted and tangled with each other when the rotating plate 120 rotates. For this purpose, the preventers 175a to 175l are provided.

The preventers 175e to 175l installed on the rotating plate 120 are provided to be paired with the prevention strips 174a to 174h.

Figure 16:
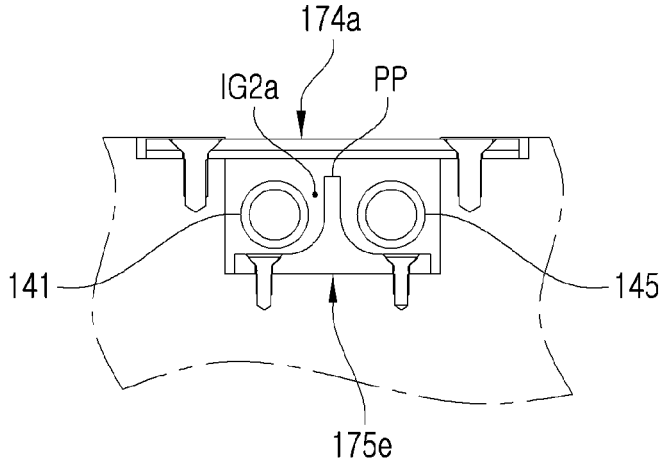
FIG. 16 is a reference diagram illustrating a preventer applied to the rotation device of FIG. 4.

As in the example of FIG. 16, the preventers 175a to 175l have prevention protrusions pp therebetween. Both movement pipes 141 to 148 that are paired with each other are separated from each other with the prevention protrusion pp interposed therebetween. Furthermore, on the rotating plate 120, the prevention strips 174a to 174h cover the preventers 175a to 175l. Accordingly, even when the rotating plate 120 rotates, the twisting of the paired movement pipes 141 to 148 may be prevented.

The setter 180 is coupled to the fixed plate 110 and sets the position of the rotating plate 120.

Figure 17A:
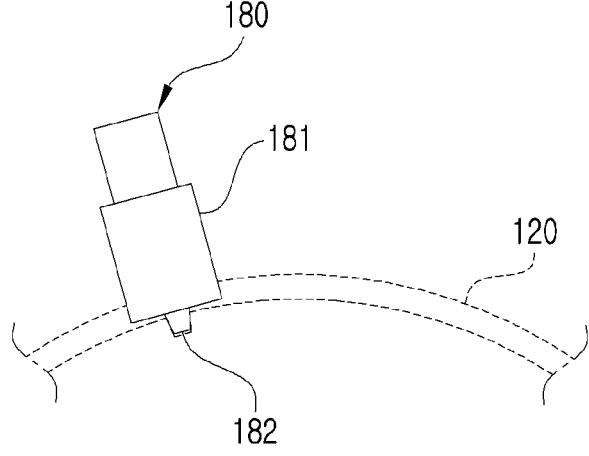
FIGS. 17A and 17B are reference diagrams illustrating a setter applied to the rotation device of FIG. 4.
Figure 17B:
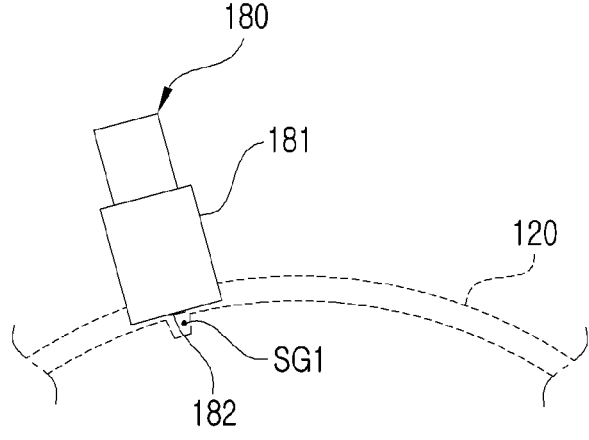

As shown in FIG. 17, the setter 180 may include a driving cylinder 181 and a load stopper 182.

The driving cylinder 181 is provided as a driving source that generates the driving force intended to advance and retreat the load stopper 182. Accordingly, any driving source that can generate a driving force intended to advance and retreat the load stopper 182 may be applied in place of the driving cylinder 181. For example, a rotary motor or a linear motor may also be applied as the driving source that selectively advances and retreats the load stopper 182.

The load stopper 182 is selectively advanced and retracted by the driving cylinder 181. When the load stopper 182 is advanced, the distal end of the load stopper 182 is inserted into the setting depressions SG1 and SG2. Accordingly, the unintended or excessive rotation of the rotating plate 120 is prevented. In other words, when the distal end of the load stopper 182 is inserted into the setting depressions SG1 and SG2, the position of the rotating plate 120 is set.

According to the present embodiment, two setting depressions SG1 and SG2 are formed at a rotation interval of 180 degrees. Accordingly, the rotating plate 120 may be positioned while selectively rotating forward or rearward by a movement angle of 180 degrees.

In contrast, when the load stopper 182 is retracted and the distal end of the load stopper 182 is separated from the setting depressions SG1 and SG2, the rotating plate 120 enters a state where it can rotate. Accordingly, the rotating plate 120 may be rotated by operating the rotator 160 in the state in which the load stopper 182 has moved rearward.

The guides 191 to 195 guide the rotating plate 120 through appropriate rotational movement.

The guides 191 to 195 are coupled to the fixed plate 110, and the front ends of the guides 191 to 195 may hang on the front of the rotating plate 120. Accordingly, the guides 191 to 195 prevent the rotating plate 120 from being freely separated forward while guiding the rotating plate 120 through rotational movement. For this purpose, an appropriate number of guides 191 to 195 may be provided. For example, in the present embodiment, five guides 191 to 195 are provided.

The operation of the above-described rotation device 100 will be described below.

When first injection is completed in the state in which the rotating plate 120 is in a forward rotation state, the setter 180 operates to remove the load stopper 182 from the setting depression SG1 on one side, thereby releasing the locked state (fixed state) of the rotating plate 120. Thereafter, the rotator 160 operates to reversely rotate the rotary plate 120 by 180 degrees. Then, the setter 180 operates to fasten the load stopper 182 to the setting depression SG2 on the other side, thereby converting the rotating plate 120 into a locked state. Then, second injection is also performed in a reverse rotation state, thereby completing double injection. It is obvious that the temperature of the fixed mold FM and the movable mold MM is controlled by temperature control fluid during the period from the time when injection is prepared to the time when a finished injection-molded product is taken out from the cavity C.

Next, the features of the rotation device 100 will be described in more detail with reference to application examples.
<Installation of Movement Pipes>

In the case where the rotation device 100 is fabricated, once the work of coupling the fixed plate 110 and the rotating plate 120 has been completed, a worker installs the movement pipes 141 to 148.

The installation of the movement pipes 141 to 148 will now be described using one example.

First, the movement pipes 141 to 148 are passed through the first through hole TH1 and the second through hole TH2. In the present embodiment, the movement pipes 141 to 148 are ultimately passed through the first through hole TH1 and the second through hole TH2 by passing the movement pipes 141 to 148 through the hollow CH of the joint 130.

Thereafter, the worker fastens one ends of the movement pipes 141 to 148 to the first blocks 171a to 171d. Then, the movement pipes 141 to 148 are inserted into the first insertion grooves IG1a to IG1d in the area where the movement pipes 141 to 148 pass through the fixed plate 110. It is obvious that the preventers 175a to 175d are coupled to the fixed plate 110 in advance.

Thereafter, the worker fastens the other ends of the movement pipes 141 to 148 to the second blocks 172a to 172d. This process will now be described with reference to FIG. 18.

Figure 18:
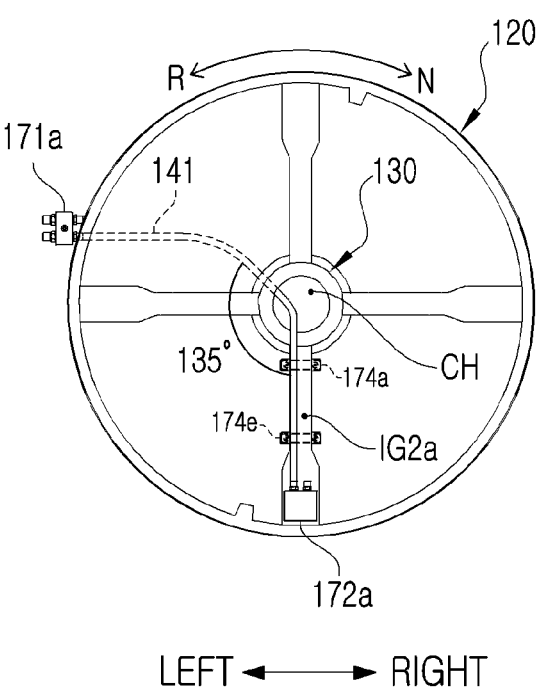
FIG. 18 is a reference diagram illustrating a method of installing a movable pipe.

FIG. 18 defines the reverse rotation direction R, which is opposite to the forward rotation direction N of the rotating plate 120, and assumes a case where the movement pipe 141 is installed. In the state in which the portion of the movement pipe 141 passing through the fixed plate 110 is inserted into the first insertion depression IG1a, the worker fastens the other end of the movement pipe 141 to the second block 172a in the state in which the movement pipe 141 is rotated through twisting by 135 degrees in the reverse rotation direction R Likewise, in the area where the movement pipe 141 passes through the rotating plate 110, the movement pipe 141 is inserted into the second insertion depression IG2a, and then the prevention strips 174a and 174e are coupled to the rotating plate 120. In this way, all the eight movement pipes 141 to 148 are installed in the state of being rotated through twisting in the reverse rotation direction R.

The reason why the movement pipes 141 to 148 are installed by twisting them by 135 degrees is to minimize the torsional stress when the rotating plate 120 rotates forward.

In general, during forward rotation, the movement pipes 141 to 148 are twisted by 180 degrees in the area where the first through hole TH1 and the second through hole TH2 are located. Then, torsional stress is applied to the movement pipes 141 to 148, and the torsional stress is accumulated due to successive forward and reverse rotations. Furthermore, eventually, the movement pipes 141 to 148 may be damaged.

For example, torsional durability may vary depending on the material of which the movement pipes 141 to 148 are made, but the movement pipes 141 to 148 need to be made of a material that can withstand a torsional stress of at least 180 degrees. However, even when the movement pipes 141 to 148 are made of a material that can withstand a torsional rotation of 180 degrees, the accumulation of torsional stress attributable to continuous use causes the movement pipes 141 to 148 to age more rapidly.

Therefore, when the movement pipes 141 to 148 are installed in the state in which they have been twisted by 135 degrees in the reverse direction in advance, the torsional stress reduced by the amount corresponding to 135 degrees is applied. However, the torsional stress corresponding to 135 degrees, which is much less than the maximum value of 180 degrees, is applied, and thus the materials of the movement pipes 141 to 148 fall within an acceptable range. In other words, the burden, caused by torsional stress, on the movement pipes 141 to 148 is reduced.

Instead, even when forward rotation by 180 degrees is performed, the movement pipes 141 to 148 are only subject to torsional stress corresponding to twisting by 45 degrees. Accordingly, the lifespan of the movement pipes 141 to 148 is increased.

This method of installing the movement pipes 141 to 148 is intended to prevent torsional stress corresponding to the maximum value of 180 degrees from being applied to the movement pipes 141 to 148. Accordingly, unlike the present example, installation in the state of being twisted by 45 or 90 degrees in the reverse rotation direction may also be taken into consideration. In other words, this feature may be satisfied if the movement pipes 141 to 148 are installed in a twisted state in a range larger than 0 degrees and smaller than 180 degrees in the reverse rotation direction. However, when the fixed plate 110 and the rotating plate 120 are fabricated, it is sufficient if the first installation grooves IG1a to IG1d and the second installation grooves IG2a to IG2d are formed to have an angular difference between the first cross shape CST and the second cross shape CS2 to match the twisting angle of the movement pipes 141 to 148.

It is obvious that as long as the feature of installing the movement pipes 141 to 148 at a twisted angle in the reverse rotation direction of the rotating plate 120 can be satisfied, the order in which the movement pipes 141 to 148 are installed may be different from that of the above example.

Meanwhile, when the injection molding machine IMM is not in use, the rotating plate 120 is rotated by 135 degrees in reverse, so that it can also be operated to further reduce the torsional stress applied to the movement pipes 141 to 148.

Figure 19A:
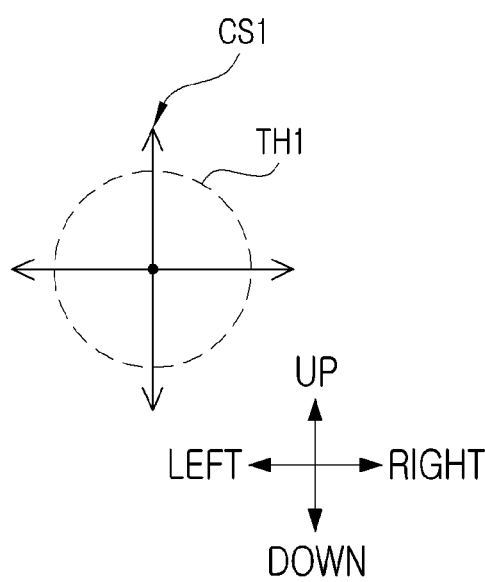
FIGS. 19A, 19B and 20 are reference diagrams illustrating another example of the method of installing a movable pipe.
Figure 19B:
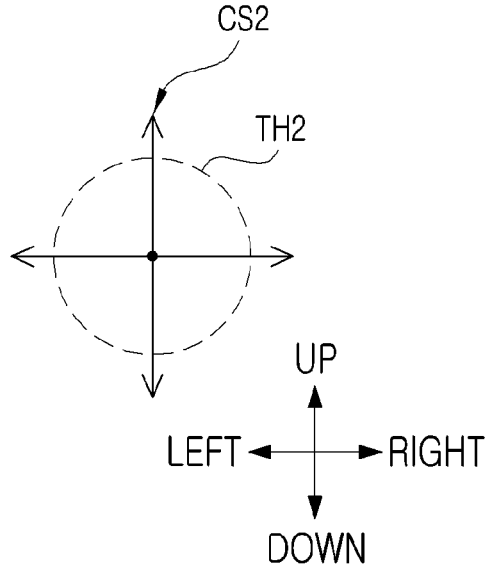
Figure 20:
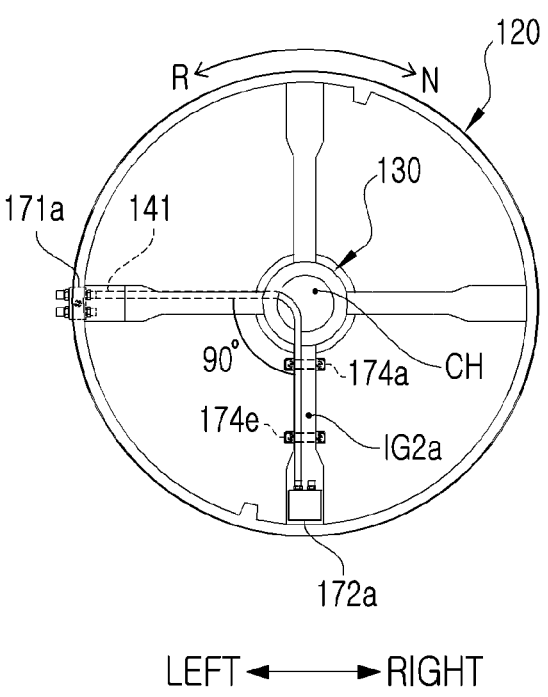

However, as shown in FIGS. 19(a) and 19(b), in the initial state in which the rotating plate 120 is coupled to the fixed plate 110, the first insertion grooves IG1a to IG1d and the second insertion grooves IG2a to IG2d may be formed such that the first cross shape CS1 and the second cross shape CS2 coincide with each other. In other words, there may be adopted an example in which where in the initial 0-degree state in which the rotating plate 120 is not rotated, the first insertion grooves IG1a to IG1d and the second insertion grooves IG1a to IG1d coincide with each other in the area adjacent to the first through hole TH1 and the second through hole TH2.

When the example of FIG. 19 is adopted, a worker twists and rotates the movement pipe 141 by 90 degrees in the reverse rotation direction R and then fastens the other end of the movement pipe 141 to the second block 172a in the state in which the movement pipe 141 has been inserted into the first insertion groove IG1a. According to this, when the rotating plate 120 rotates 180 degrees forward or rearward from its initial 0-degree state, the torsional stress applied to the movement pipe 141 occurs only by as much as the angle between 0 degrees and 90 degrees. In other words, when the injection molding machine IMM operates, the maximum torsional stress applied to the movement pipe 141 occurs only by as much as an angle of 90 degrees. Therefore, the torsional stress of the movement pipe 141 is further reduced, making it possible to further extend the lifespan of the movement pipe 141.

<Detachment of Rotation Device>

The purpose of the injection molding machine IMM may be converted from double injection to general injection, or from general injection to double injection.

When the purpose of the injection molding machine IMM is converted from double injection to general injection, the rotation device 100 needs to be detached. In contrast, when the purpose of the injection molding machine IMM is converted from general injection to double injection, the rotation device 100 needs to be mounted.

First, when the purpose of the injection molding machine IMM is converted from double injection to general injection, the rotation device 100 needs to be detached. To this end, a worker separates the distribution pipes P1 and P2 from the first blocks 171a to 171d. In this way, the work of separating the distribution pipes P1 and P2 is simply completed by performing the work of separating the distribution pipes P1 and P2 from the first blocks 171a to 171d. Thereafter, the rotation device 100 may be easily separated from the injection molding machine IMM by detaching the rotation device 100 from the movable plate MF. In other words, the work of separating the movement pipes 141 to 148 from the rotation device 100 or organizing them is not required.

Thereafter, a movable mold MM for general injection is mounted on the movable plate MF and the movable mold MM and the distributor DA are connected with new movement pipes, so that the purpose of the injection molding machine IMM can be easily converted to general injection.

In contrast, when the purpose of the injection molding machine IMM is converted from general injection to double injection, the rotation device 100 is coupled to the movable plate MF and then the distribution pipes P1 and P2 are fastened to the first blocks 171a to 171d, so that the purpose of the injection molding machine IMM can be easily converted to double injection.

<Replacement of Movable Mold>

Even in the case of the same double injection, an injection-molded product to be produced may vary. In this case, it is necessary to replace the movable mold MM.

In order to replace the movable mold MM, a worker separates the transfer pipes 151 to 158 from the movable mold MM. Thereafter, the movable mold MM is separated from the rotation device 100. Furthermore, a new mobile mold MM is mounted on the rotation device 100 and then the transfer pipes 151 to 158 are coupled to the movable mold MM, so that the movable molds MM can be easily replaced with each other.

In this process, the transfer pipes 151 to 158 hang in the state of being fastened to the second blocks 172a to 172d, so that they do not become entangled with each other or confused in identification.

According to the present disclosure, the following effects are achieved:

First, the movement pipes are installed independently from the movable plate, so that the work of installing and connecting the movement pipes is facilitated.

Second, the movement pipes are installed to be integrated with the rotation device, so that the rotation device can be modularized into a single part, thereby making it easy to manufacture the injection molding machine and replace or remove the rotation device.

Third, the positions of the movement pipes are aligned, so that there is no concern about confusion between the positions of the movement pipes during the process of replacing the movable mold. Therefore, despite the replacement of the movement mold, the torsional stress of all the movement pipes may be maintained in a uniform state.

The above-described embodiments have been described as examples of the present disclosure, and may have various application forms. Therefore, the present disclosure should not be construed as being limited to the above-described embodiments. Instead, the scope of rights of the present disclosure should be understood as encompassing the separately attached claims and their equivalents.

What is claimed is:

1. A rotation device for an injection molding machine, the rotation device comprising:

a fixed plate coupled to a movable plate, and provided with a first through hole which is formed in a center thereof, a rotating plate rotatably coupled to the fixed plate, provided with a second through hole corresponding to the first through hole, and formed such that a movable mold is coupled thereto;

movement pipes installed on the fixed plate and the rotating plate, disposed to pass through the first through hole and the second through hole, and configured to provide movement paths for temperature control fluid between the fixed plate and the rotating plate; and fixed blocks configured to fix the movement pipes; and wherein the movement pipes are connected to distribution pipes of a distributor which distributes temperature control fluid at an edge of the fixed plate, wherein the movement pipes are installed to pass from the edge of the fixed plate through the fixed plate, the first through hole and the second through hole, and then the rotating plate.

2. The rotation device of claim 1, wherein: the fixed blocks comprise:

first blocks configured to fasten one ends of the movement pipes to the fixed plate, and coupled to the fixed plate; and second blocks configured to fasten remaining ends of the movement pipes to the rotating plate, and coupled to the rotating plate; and the first blocks are disposed alongside each other on one side of the fixed plate forming a portion of the edge of the fixed plate.

3. The rotation device of claim 2, wherein:

the first blocks function as connection ports which connect movement paths for temperature control fluid between the distribution pipes and the movement pipes; and the second blocks function as connection ports which connect movement paths for temperature control fluid between the movement pipes and transfer pipes, which are transfer paths for temperature control fluid between the movement pipes and the movable mold.

4. The rotation device of claim 1, further comprising switching ports configured to change a moving direction of temperature control fluid;

wherein at least one of the movement pipes is installed such that the temperature control fluid passes through at least one of the switching ports.

5. The rotation device of claim 4, wherein the switching ports are coupled to the fixed plate.

6. The rotation device of claim 1, wherein:

first insertion grooves into which the movement pipes are inserted are formed in the fixed plate on a surface of the fixed plate opposite to a surface of the fixed plate facing the rotating plate; and second insertion grooves into which the movement pipes are inserted are formed in the rotating plate on a surface of the rotating plate opposite to a surface of the rotating plate facing the fixed plate.

7. The rotation device of claim 6, further comprising prevention strips configured to prevent the movement pipes, inserted into the first insertion grooves or the second insertion grooves, from being separated.

8. The rotation device of claim 6, wherein, when viewed in a direction from the fixed plate toward the rotating plate, the first insertion grooves and the second insertion grooves are formed to have an angular difference of 45 degrees therebetween in an area adjacent to the first through hole and the second through hole, so that the first insertion grooves and the second insertion grooves coincide with each other when the rotating plate is rotated by 45 degrees from an initial 0-degree state.

9. The rotation device of claim 8, wherein the movement pipes are inserted into the first insertion grooves, twisted by 135 degrees in a reverse rotation direction of the rotating plate while passing through the first through hole and the second through hole, and inserted into the second insertion grooves.

10. The rotation device of claim 6, wherein:

when viewed from the fixed plate toward the rotating plate, the first insertion grooves and the second insertion grooves coincide with each other in an area adjacent to the first through hole and the second through hole; and the movement pipes are inserted into the first insertion grooves, twisted by 90 degrees in a reverse rotation direction of the rotating plate while passing through the first through hole and the second through hole, and inserted into the second insertion grooves.

11. The rotation device of claim 1, wherein:

the fixed plate is detachably coupled to the movable plate; and the movement pipes are installed to be connected to the distribution pipes in a state in which the distribution pipes are disposed in an outer area outside an edge of the movable plate.

* * * * *